(12) United States Patent
Shigeta et al.

(10) Patent No.: US 9,694,710 B2
(45) Date of Patent: Jul. 4, 2017

(54) VEHICLE CONTROL DEVICE

(71) Applicant: JTEKT CORPORATION, Osaka-shi (JP)

(72) Inventors: Ryohei Shigeta, Anjo (JP); Yoshinao Iwase, Nagoya (JP); Keita Nomura, Kariya (JP); Ryouichi Kubo, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 73 days.

(21) Appl. No.: 14/679,296

(22) Filed: Apr. 6, 2015

(65) Prior Publication Data

US 2015/0291058 A1    Oct. 15, 2015

(30) Foreign Application Priority Data

Apr. 10, 2014 (JP) ................ 2014-081126
Oct. 10, 2014 (JP) ................ 2014-208789

(51) Int. Cl.
*B60L 15/20* (2006.01)
*B60L 15/10* (2006.01)

(52) U.S. Cl.
CPC ............ *B60L 15/20* (2013.01); *B60L 15/10* (2013.01); *B60L 2240/16* (2013.01); *F02D 2250/26* (2013.01); *Y02T 10/645* (2013.01); *Y02T 10/7275* (2013.01); *Y10S 903/902* (2013.01)

(58) Field of Classification Search
CPC .... B60L 15/10; B60L 15/20; B60L 2240/423; B60L 2240/443; B60L 2240/463; B60L 2240/14; B60L 2240/16; F02D 11/105; F02D 2200/1002; F02D 2250/18; F02D 2250/26; Y02T 10/7275; B60W 2510/083; B60W 2710/0666; B60W 2710/083
See application file for complete search history.

(56) References Cited

U.S. PATENT DOCUMENTS

| | | | | |
|---|---|---|---|---|
| 6,050,357 | A | * | 4/2000 | Staelin ................ A63C 17/004 180/181 |
| 2006/0108956 | A1 | | 5/2006 | Clark et al. |
| 2008/0121443 | A1 | | 5/2008 | Clark et al. |
| 2009/0243518 | A1 | | 10/2009 | Itoh |
| 2009/0259356 | A1 | | 10/2009 | Clark et al. |
| 2011/0106357 | A1 | | 5/2011 | Clark et al. |

(Continued)

FOREIGN PATENT DOCUMENTS

| | | |
|---|---|---|
| EP | 1 655 830 A1 | 5/2006 |
| JP | 09-322311 A | 12/1997 |
| JP | 3180671 B2 | 4/2001 |

OTHER PUBLICATIONS

Extended European Search Report issued Nov. 5, 2015 in Patent Application No. 15162952.4.

*Primary Examiner* — Spencer Patton
(74) *Attorney, Agent, or Firm* — Oblon, McClelland, Maier & Neustadt, L.L.P.

(57) ABSTRACT

A vehicle control device controls torque of a drive motor such that rotation of the drive motor is transferred to rear drive wheels of a vehicle via a drive unit that includes a speed reducer including a plurality of gears rotatably supported by bearings. The vehicle control device sets different values as torque restriction values for torque to be generated by the drive motor when the vehicle is driven forward and when the vehicle is driven rearward.

2 Claims, 6 Drawing Sheets

(56) References Cited

U.S. PATENT DOCUMENTS

| | | | |
|---|---|---|---|
| 2012/0116628 A1 | 5/2012 | Clark et al. | |
| 2013/0041561 A1* | 2/2013 | Asami | E02F 9/2246 701/50 |
| 2013/0166130 A1 | 6/2013 | Suzuki | |
| 2015/0005130 A1* | 1/2015 | Yamamoto | B60K 7/00 475/149 |
| 2015/0006006 A1* | 1/2015 | Scheidle | B60L 11/1803 701/22 |
| 2015/0149057 A1* | 5/2015 | Cho | B60W 10/06 701/84 |
| 2015/0291151 A1 | 10/2015 | Shigeta et al. | |

* cited by examiner

VEHICLE CONTROL DEVICE

INCORPORATION BY REFERENCE

The disclosures of Japanese Patent Applications No. 2014-081126 and No. 2014-208789 respectively filed on Apr. 10, 2014 and Oct. 10, 2014, each including the specification, drawings and abstract, are incorporated herein by reference in their entireties.

BACKGROUND OF THE INVENTION

1. Field of the Invention

The present invention relates to a vehicle control device.

2. Description of the Related Art

Japanese Patent Application Publication No. 9-322311 (JP 9-322311 A), for example, describes a vehicle control device according to the related art that is provided in a vehicle to control rotation of a motor that generates a drive force on a drive shaft that transmits torque to drive wheels. In the vehicle control device, motors such as a clutch motor and an assist motor are controlled to control torque to be transferred to the drive wheels.

In a vehicle control device such as that according to JP 9-322311 A, a target value is derived so that torque that corresponds to the amount by which a driver depresses an accelerator pedal is output as described in relation to control during rearward travel of a vehicle. A torque command value is set in accordance with the derived target value so as to cause the clutch motor and the assist motor to output torque.

In some cases, torque transferred from each motor to the drive wheels passes through a drive unit that includes a speed reducer. The drive unit includes a plurality of gears rotatably supported by a plurality of bearings, and a load acts on the bearings because of rotation of the gears when the vehicle travels forward or rearward.

If the vehicle control device according to JP 9-322311 A is applied to the drive unit, the difference between maximum torque required during forward travel of the vehicle and maximum torque required during rearward travel of the vehicle is not taken into consideration in deriving the target value. Thus, a load is applied to the bearings constituting the drive unit in the same manner irrespective of whether the vehicle is traveling forward or rearward, which is disadvantageous in terms of extending the life of the bearings of the drive unit.

SUMMARY OF THE INVENTION

It is an object of the present invention to provide a vehicle control device capable of extending the life of bearings of a drive unit.

According to an aspect of the present invention, a vehicle control device includes:

a computation unit that computes a torque command value for controlling a motor;

a storage unit that stores a map for use to compute the torque command value; and a shift position signal reception unit that receives a shift position signal that indicates whether a vehicle is traveling forward or rearward.

The vehicle control device is programmed to control a drive unit that transfers rotation of the motor to drive wheels of the vehicle and that includes a speed reducer including a plurality of gears rotatably supported by bearings.

The vehicle control device is programmed to calculate the torque command value for causing the motor to generate torque on the basis of the map.

The vehicle control device is programmed to set a maximum value of torque that is allowed to be generated by the motor during forward travel of the vehicle so as to be different from a maximum value of torque that is allowed to be generated by the motor during rearward travel of the vehicle.

Depending on the specifications of the drive system of the vehicle, the magnitude of torque to be generated during forward travel of the vehicle may not necessarily be the same as that during rearward travel of the vehicle in some cases, and the maximum value of torque that is allowed to be generated during forward travel and that during rearward travel may be set as different values in some cases. That is, depending on the direction of movement of the vehicle, travel of the vehicle is not obstructed even if the maximum value of torque generated by the motor is reduced in some cases, and the maximum value of torque can be set to be smaller than the maximum value of torque during movement of the vehicle in the other direction.

Under the above precondition, according to the vehicle control device described above, the load that acts on the bearings constituting the drive unit is reduced during movement in the direction for which the maximum value of torque is set to a smaller value compared to movement in the other direction. Thus, the life of the bearings of the drive unit can be extended.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A vehicle control device according to a first embodiment will be described below.

Figure 1:
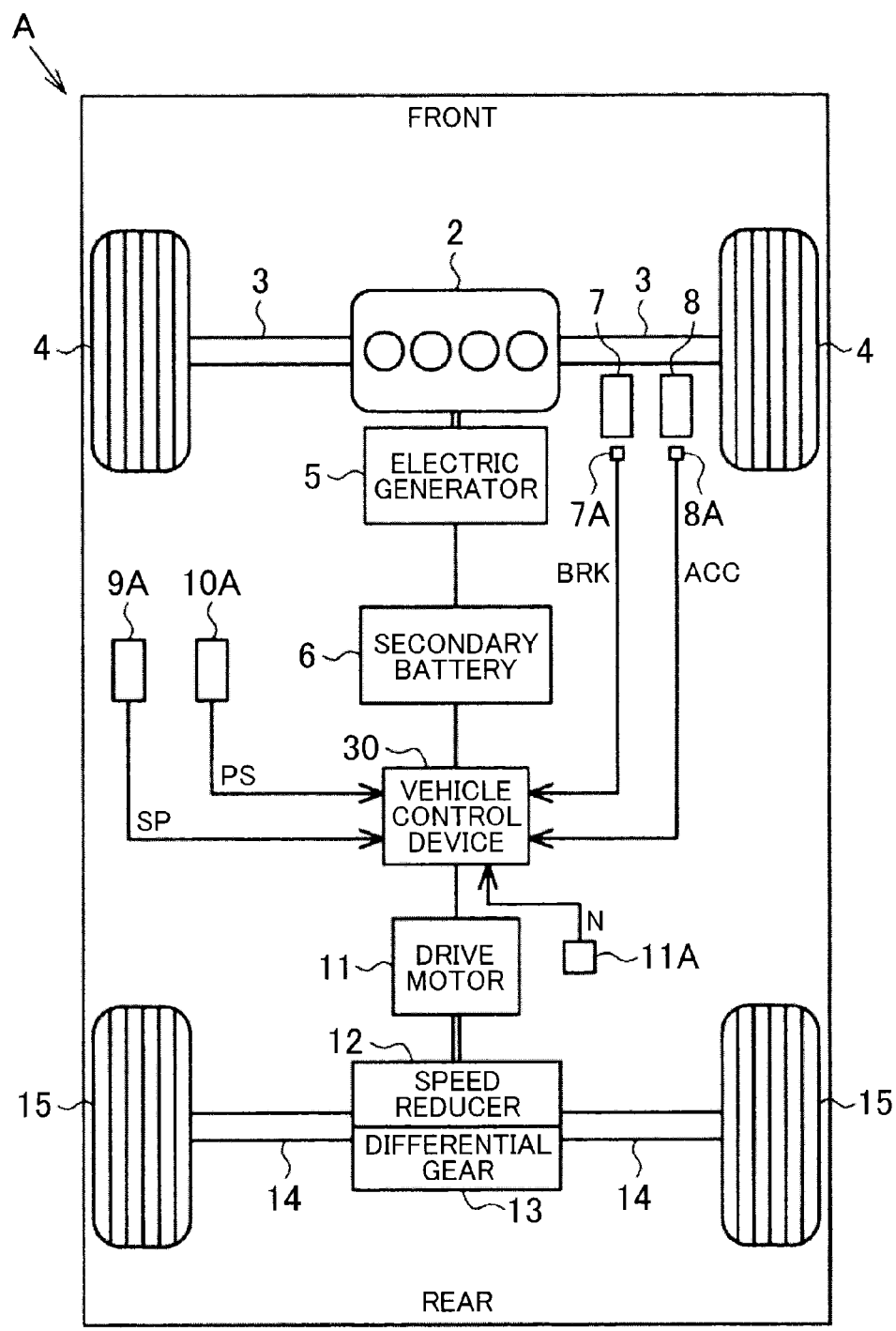
FIG. 1 illustrates an overview of a vehicle according to a first embodiment.

As illustrated in FIG. 1, a vehicle A includes an internal combustion engine 2 that serves as a main drive source. Drive shafts 3 that transfer power of the internal combustion engine 2 are mechanically coupled to the internal combustion engine 2. A pair of right and left front drive wheels 4 provided on the front side of the vehicle is coupled to the internal combustion engine 2 via the drive shafts 3.

An electric generator (in the embodiment, a three-phase brushless motor) 5 that rotates using power of the internal combustion engine 2 to generate electricity is mechanically coupled to the internal combustion engine 2. A secondary battery 6 that is constituted of a lithium-ion battery, for example, is electrically connected to the electric generator 5 as a power source to be charged with electricity generated by the electric generator 5. A vehicle control device 30 that operates using electricity from the secondary battery 6 is electrically connected to the secondary battery 6. A drive motor (in the embodiment, a three-phase brushless motor) 11 that serves as an auxiliary drive source for the vehicle A is also electrically connected to the secondary battery 6 via the vehicle control device 30.

Various sensors that detect the travel state of the vehicle A or the like including a brake sensor 7A, an accelerator sensor 8A, a vehicle speed sensor 9A, a position sensor 10A, and a rotational speed sensor 11A are electrically connected to the vehicle control device 30. The brake sensor 7A is a sensor that detects a brake operation amount BRK of a brake pedal 7. The accelerator sensor 8A is a sensor that detects an accelerator operation amount ACC of an accelerator pedal 8. The vehicle speed sensor 9A is a sensor that detects a vehicle speed SP of the vehicle A. The position sensor 10A is a sensor that detects a shift position PS of an automatic transmission of the vehicle A. The detected shift position may be whether the shift position of the automatic transmission is a forward travel position or a rearward travel position, for example. The rotational speed sensor 11A is a sensor that detects the rotational speed of the drive motor 11, that is, a motor rotational speed N.

Figure 2:
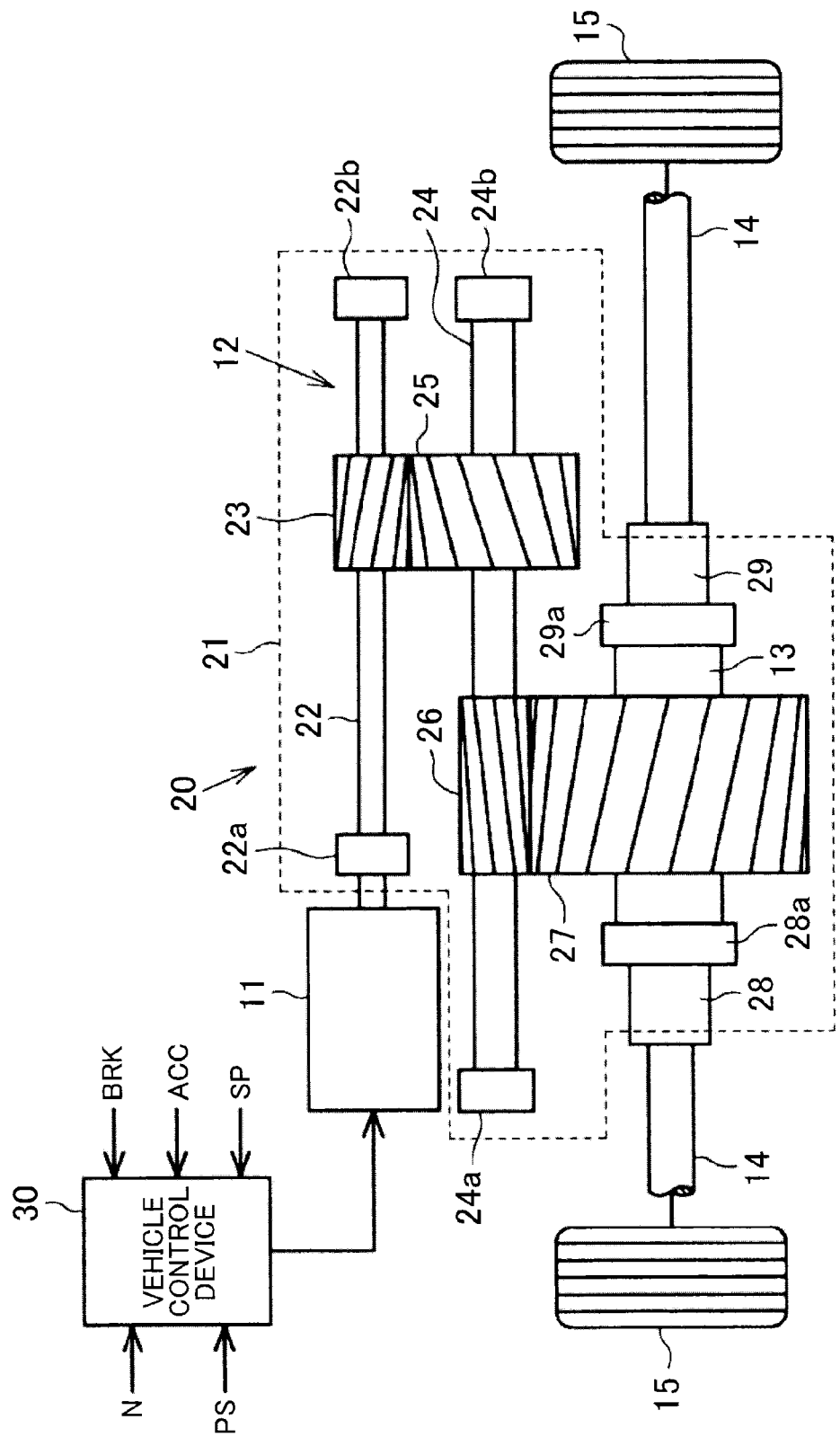
FIG. 2 illustrates an overview of a drive unit.

As illustrated in FIG. 2, the vehicle control device 30 grasps the travel state of the vehicle A on the basis of detection signals from the sensors, and controls various in-vehicle devices in accordance with the grasped travel state. In the embodiment, drive of the drive motor 11, which is an example of such in-vehicle devices, is controlled.

A speed reducer 12 and a differential gear 13 that adjust and transfer power of the drive motor 11 to drive shafts 14 are coupled to the drive motor 11. A pair of right and left rear drive wheels 15 provided on the rear side of the vehicle is coupled to the drive motor 11 via the speed reducer 12, the differential gear 13, and the drive shafts 14.

The vehicle A according to the embodiment is a so-called front-engine front-drive (FF) vehicle in which power of the internal combustion engine 2 mounted on the front side of the vehicle A is provided to the front drive wheels 4 to generate a drive force of the vehicle A. The vehicle A is a so-called hybrid four-wheel drive vehicle in which the electric generator 5 generates electricity using power of the internal combustion engine 2 to charge the secondary battery 6 and electricity is supplied from the secondary battery 6 to the drive motor 11 which drives the rear drive wheels 15 to generate a drive force of the vehicle A.

The drive force generated by the drive motor 11 is transferred to the rear drive wheels 15 by way of the drive shafts 14.

The configuration of the drive motor 11, the speed reducer 12, the differential gear 13, and the drive shafts 14 will be described.

As illustrated in FIG. 2, the speed reducer 12 and the differential gear 13 are housed in a housing 21 to constitute a drive unit 20 that transfers power from the drive motor 11 to the drive shafts 14 and the rear drive wheels 15.

The drive unit 20 includes an input shaft 22 mechanically coupled to the drive motor 11 to transfer power of the drive motor 11 to the speed reducer 12. The input shaft 22 is rotatably supported by a first input bearing 22a and a second input bearing 22b fixed to the housing 21. An input gear 23 having helical teeth (see FIG. 2; with tooth traces depicted as sloping downward to the right) is coupled to the input shaft 22 so as to rotate together with the input shaft 22.

A large-diameter intermediate gear 25 is meshed with the input gear 23. The large-diameter intermediate gear 25 is coupled so as to rotate together with an intermediate shaft 24, has helical teeth (see FIG. 2; with tooth traces depicted as sloping downward to the left), and is larger in diameter than the input gear 23. The intermediate shaft 24 is rotatably supported by a first intermediate bearing 24a and a second intermediate bearing 24b fixed to the housing 21. A small-diameter intermediate gear 26 is coupled to a portion of the intermediate shaft 24 between the large-diameter intermediate gear 25 and the first intermediate bearing 24a so as to rotate together with the intermediate shaft 24. The small-diameter intermediate gear 26 has helical teeth (see FIG. 2; with tooth traces depicted as sloping downward to the left), is smaller in diameter than the large-diameter intermediate gear 25, and has a large length in the axial direction.

An output gear 27 is meshed with the small-diameter intermediate gear 26. The output gear 27 is mechanically coupled so as to transfer power transferred from the drive motor 11 to the differential gear 13, has helical teeth (see FIG. 2; with tooth traces depicted as sloping downward to the right), and is larger in diameter than the small-diameter intermediate gear 26. The differential gear 13 includes a first output shaft 28 and a second output shaft 29 that are rotatable along with rotation of the output gear 27. The differential gear 13 transfers power transferred from the drive motor 11 to the first output shaft 28 and the second output shaft 29 while allowing relative rotation between the first output shaft 28 and the second output shaft 29. The differential gear 13 is rotatably supported by a first output bearing 28a and a second output bearing 29a fixed to the housing 21.

The drive shafts 14 are mechanically coupled to the first output shaft 28 and the second output shaft 29. The drive shafts 14 transfer a force transferred from the drive motor 11 via the speed reducer 12 and the differential gear 13 to the rear drive wheels 15. In the embodiment, the input shaft 22, the input gear 23, the intermediate shaft 24, the large-diameter intermediate gear 25, the small-diameter intermediate gear 26, and the output gear 27, which are disposed in the path through which power of the drive motor 11 is transferred to the differential gear 13, constitute the speed reducer 12.

Figure 3:
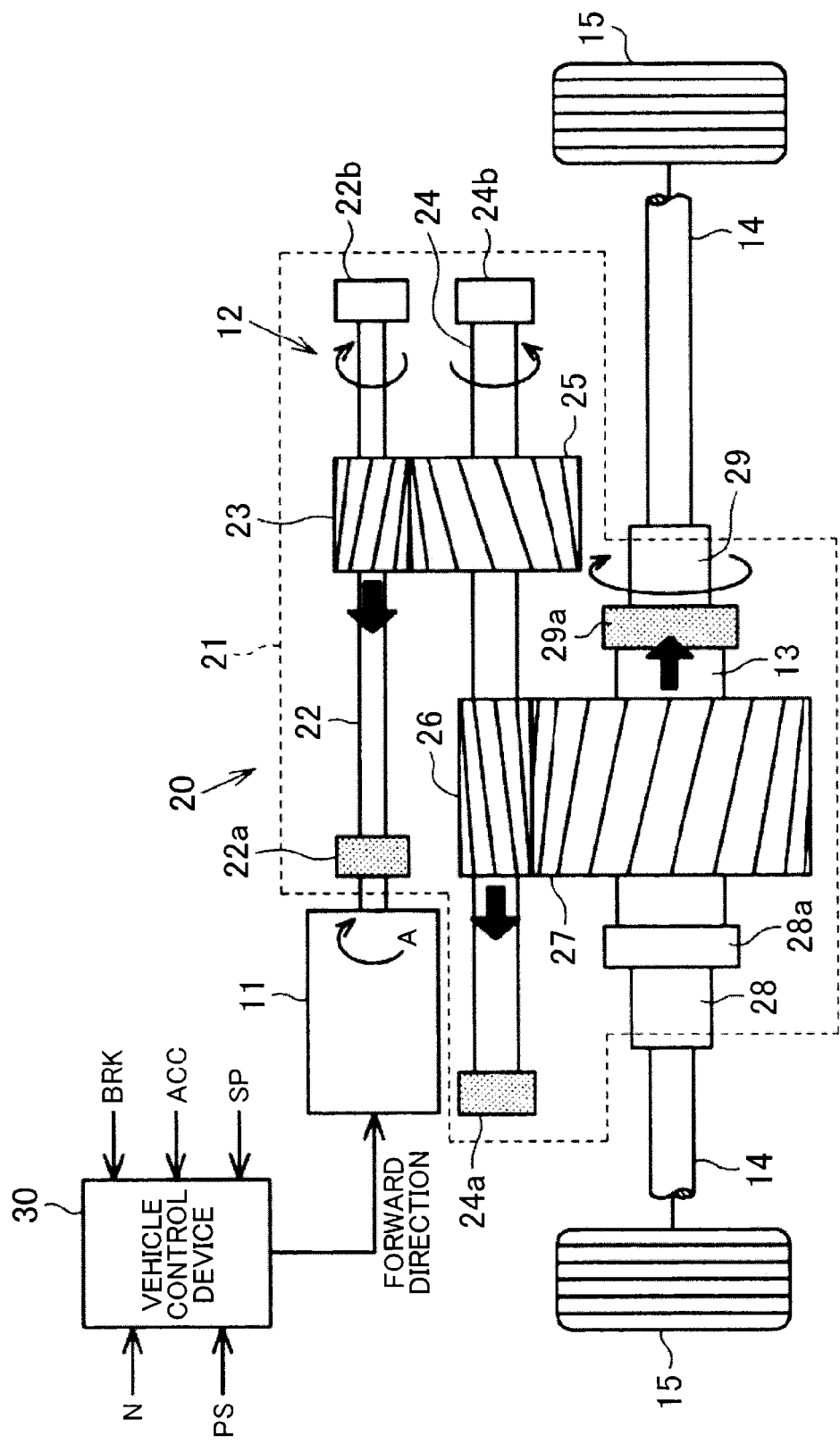
FIG. 3 illustrates operation of the drive unit during forward travel of the vehicle.

In the drive unit 20, as illustrated in FIG. 3, when the vehicle control device 30 provides a command to drive the vehicle A forward and the drive motor 11 rotates in the A direction (forward direction), the input shaft 22 and the input gear 23 are rotated in the same direction. The large-diameter intermediate gear 25 is rotated in the direction opposite to the A direction through meshing with the input gear 23. The intermediate shaft 24 and the small-diameter intermediate gear 26 are rotated together in the direction opposite to the A direction through rotation of the large-diameter intermediate gear 25. The output gear 27 is rotated in the A direction through meshing with the small-diameter intermediate gear 26. The first output shaft 28 and the second output shaft 29 are relatively rotated in the A direction via the differential gear 13 through rotation of the output gear 27.

A reaction force received by the input gear 23 from the large-diameter intermediate gear 25 through the rotation described above acts on the first input bearing 22a as a force in the axial direction of the input shaft 22.

A force received by the large-diameter intermediate gear 25 from the input gear 23 through the rotation described above acts on the second intermediate bearing 24b as a force in the axial direction of the intermediate shaft 24. On the other hand, a reaction force received by the small-diameter intermediate gear 26 from the output gear 27 through the rotation described above acts on the first intermediate bearing 24a as a force in the axial direction of the intermediate shaft 24. In the embodiment, the large-diameter intermediate gear 25 is larger in diameter than the small-diameter intermediate gear 26. Thus, the reaction force transmitted from the output gear 27 to the small-diameter intermediate gear 26 is larger than the force transmitted from the input gear 23 to the large-diameter intermediate gear 25, and the difference between such forces acts on the first intermediate bearing 24a as a force in the axial direction of the intermediate shaft 24.

A force transmitted from the small-diameter intermediate gear 26 to the output gear 27 through the rotation described above acts on the second output bearing 29a as a force in the axial direction of the differential gear 13.

As understood from the above description, bearings such as the first input bearing 22a, the first intermediate bearing 24a, and the second output bearing 29a receive a force in the axial direction when the vehicle travels forward.

Figure 4:
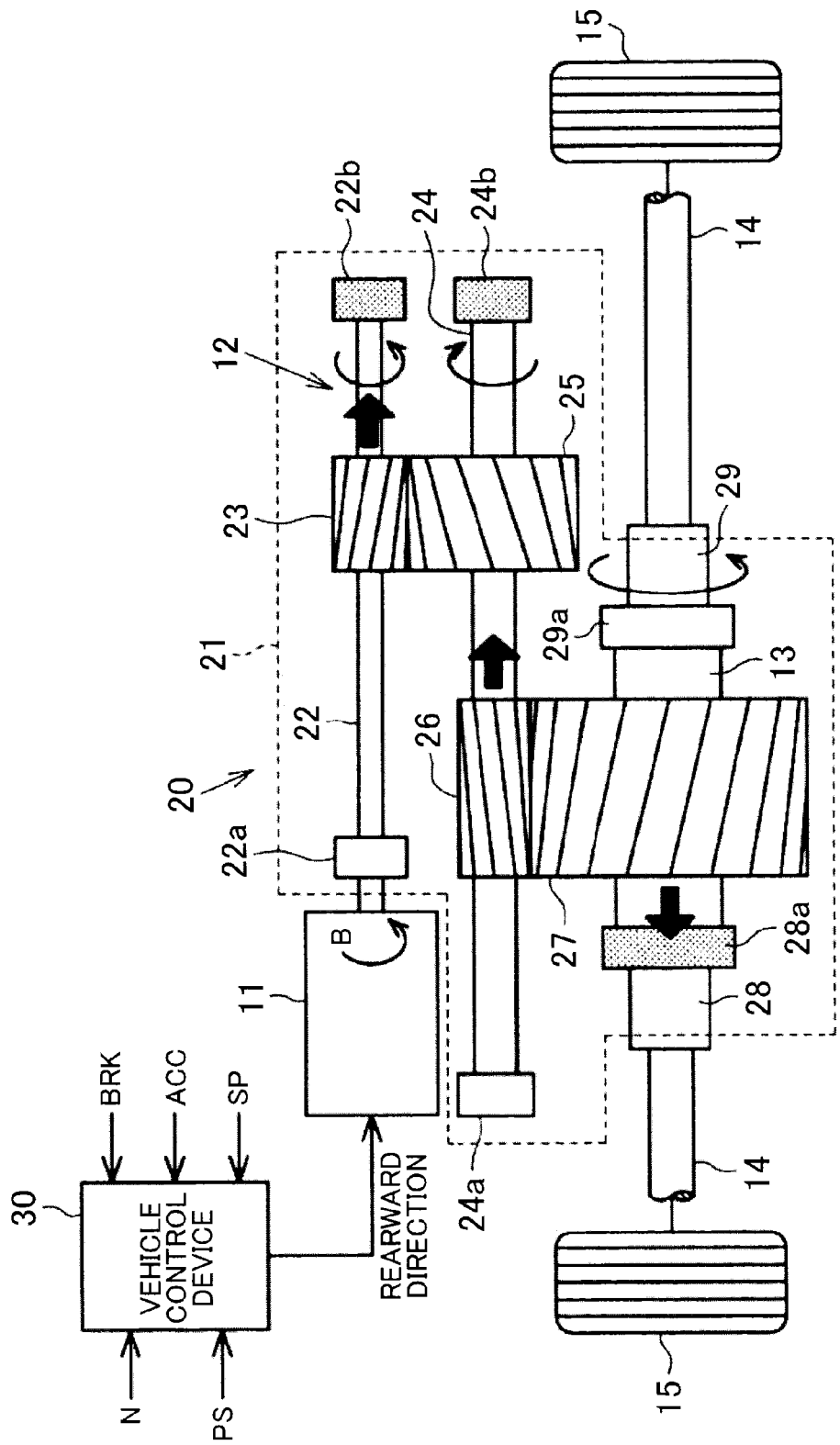
FIG. 4 illustrates operation of the drive unit during rearward travel of the vehicle.

In the drive unit 20, as illustrated in FIG. 4, when the vehicle control device 30 provides a command to drive the vehicle A rearward and the drive motor 11 rotates in the B direction (rearward direction), the input shaft 22 and the input gear 23 are rotated in the same direction. The large-diameter intermediate gear 25 is rotated in the direction opposite to the B direction through meshing with the input gear 23. The intermediate shaft 24 and the small-diameter intermediate gear 26 are rotated together in the direction opposite to the B direction through rotation of the large-diameter intermediate gear 25. The output gear 27 is rotated in the B direction through meshing with the small-diameter intermediate gear 26. The first output shaft 28 and the second output shaft 29 are relatively rotated in the B direction via the differential gear 13 through rotation of the output gear 27.

A reaction force received by the input gear 23 from the large-diameter intermediate gear 25 through the rotation described above acts on the second input bearing 22b as a force in the axial direction of the input shaft 22.

A force received by the large-diameter intermediate gear 25 from the input gear 23 through the rotation described above acts on the first intermediate bearing 24a as a force in the axial direction of the intermediate shaft 24. On the other hand, a reaction force received by the small-diameter intermediate gear 26 from the output gear 27 through the rotation described above acts on the second intermediate bearing 24b as a force in the axial direction of the intermediate shaft 24. In the embodiment, the large-diameter intermediate gear 25 is larger in diameter than the small-diameter intermediate gear 26. Thus, the reaction force transmitted from the output gear 27 to the small-diameter intermediate gear 26 is larger than the force transmitted from the input gear 23 to the large-diameter intermediate gear 25, and the difference between such forces acts on the second intermediate bearing 24b as a force in the axial direction of the intermediate shaft 24.

A force transmitted from the small-diameter intermediate gear 26 to the output gear 27 through the rotation described above acts on the first output bearing 28a as a force in the axial direction of the differential gear 13.

That is, bearings such as the second input bearing 22b, the second intermediate bearing 24b, and the first output bearing 28a receive a force in the axial direction when the vehicle travels rearward.

A process for the vehicle control device 30 to control drive of the drive motor 11 will be described.

The vehicle control device 30 includes a computation unit that computes a torque command value. In the case where a command value is generated to rotate the drive motor 11 in order to drive the vehicle A forward or rearward, torque to be generated by the drive motor 11 is commanded as a torque command value T*.

A torque restriction value is defined that falls within the range of torque that can be generated by the drive motor 11 in accordance with the specifications of the drive motor 11. The maximum value of the torque command value T* is restricted by the torque restriction value. The upper limit of torque generated by the drive motor 11 is restricted by the torque restriction value defined in advance. The torque command value T* is calculated using a map (not illustrated) in accordance with the various detection signals such as the brake operation amount BRK, the accelerator operation amount ACC, the vehicle speed SP, and the motor rotational speed N. The map is stored in advance in a storage unit that constitutes the vehicle control device.

The vehicle control device includes a shift position signal reception unit that receives the shift position PS which is a shift position signal. The torque command value T* which commands torque (forward travel torque T(+) [N]) for forward drive (forward rotation (+ side) of the drive motor 11) and torque (rearward travel torque T(−) [N]) for rearward drive (rearward rotation (− side) of the drive motor 11) is computed in accordance with the shift position PS. In the embodiment, the torque command value T* is calculated as the absolute value of torque to be generated by the drive motor 11 using an identical map during both forward travel and rearward travel. The torque command value T* is set to the same value as the torque restriction value in a motor rotational speed range in which the motor rotational speed N [rpm] is from zero to a threshold α. The torque command value T* is set so as to become smaller as the motor rotational speed N becomes higher in a motor rotational speed range in which the motor rotational speed N [rpm] is more than the threshold α.

When the vehicle is driven forward on the basis of the shift position PS, the vehicle control device 30 performs a driving process in which the torque command value T* is computed using the map described above from the various detection signals and rotation (forward rotation) of the drive motor 11 is controlled in accordance with the torque command value T*. The vehicle control device 30 sets the map described above with the torque restriction value for the drive motor 11 during forward travel set to T(+)max, and stores the map in the storage unit.

Figure 5:
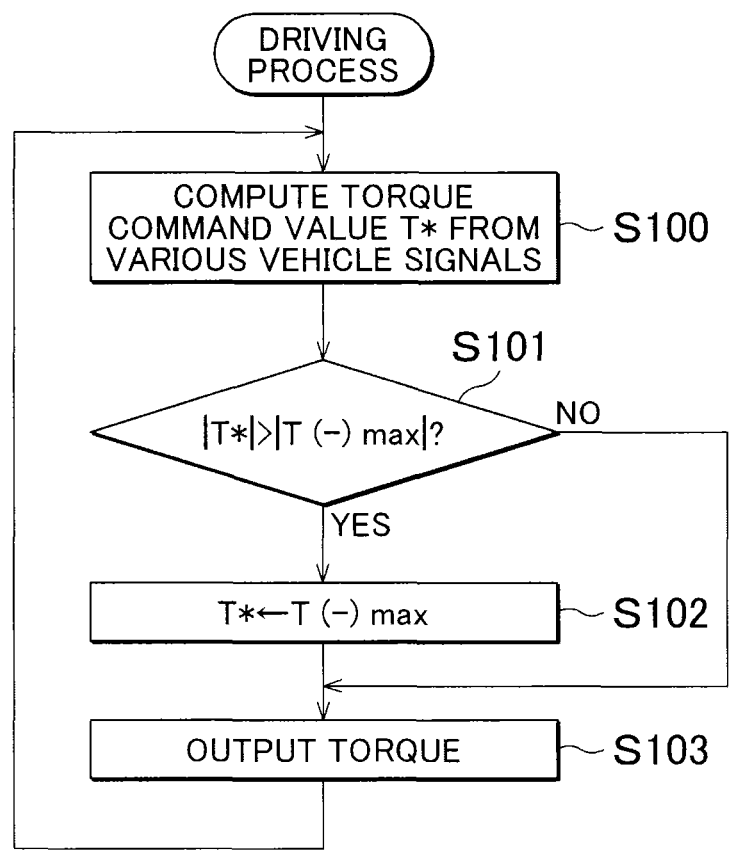
FIG. 5 is a flowchart illustrating a driving process.

FIG. 5 illustrates a driving process performed when the vehicle control device 30 drives the vehicle rearward on the basis of the shift position PS.

The vehicle control device 30 executes a derivation process in which a torque command value T* is computed using the map described above from the various detection signals (step S100). Subsequently, the vehicle control device 30 determines whether or not the absolute value of the torque command value T* computed in step S100 is more than the absolute value of T(−)max (|T*|>|T(−)max|) (step S101). T(−)max is the upper limit of torque that is allowed to be generated by the drive motor 11 during rearward travel, namely the torque restriction value during rearward travel. In the vehicle according to the embodiment, the center of gravity is leaned to the front wheel side, and the vehicle weight acting on the front wheels is larger than the vehicle weight acting on the rear wheels. The response of the vehicle is improved if the drive motor 11 generates large torque during forward travel in which the vehicle travels to the side where a large weight acts on the wheels, namely to the front wheel side. Therefore, it is desirable that the torque restriction value T(+)max during forward travel, which is the upper-limit value of torque that is allowed to be generated by the drive motor 11 during forward travel, should be larger than the torque restriction value T(−)max during rearward travel, and the torque restriction value is set in such a manner in the map according to the embodiment described above.

If it is determined in step S101 that the absolute value of the torque command value T* is larger (larger on the negative (−) side) than the absolute value of T(−)max (step S101: YES), the vehicle control device 30 executes a setting process in which T(−)max is set in place of the value computed in step S100 as the torque command value T* (step S102). After that, the vehicle control device 30 controls rotation (reverse rotation) of the drive motor 11 so as to output torque at the torque command value T* set in step S102 (step S103).

If it is determined in step S101 that the torque command value T* is not larger than T(−)max (step S101: NO), on the other hand, the vehicle control device 30 controls rotation (reverse rotation) of the drive motor 11 so as to output torque at the value computed in step S100 as it is as the torque command value T* (step S103).

According to the vehicle control device 30 described above, the following functions and advantageous effects are obtained.

(1) Depending on the specifications of the drive system of the vehicle, the magnitude of torque to be generated during forward travel of the vehicle may not necessarily be the same as that during rearward travel of the vehicle in some cases, and the maximum value of torque that is allowed to be generated during forward travel and that during rearward travel may be set as different values in some cases.

Specifically, when the vehicle moves to the smaller front-rear weight distribution side, travel of the vehicle is not obstructed even if drive torque is small at the start of travel of the vehicle compared to movement to the larger front-rear weight distribution side. That is, in the vehicle A according to the embodiment which is an FF vehicle, the front-rear weight distribution of the vehicle A is determined such that the weight on the rear side of the vehicle is smaller, and the maximum value of torque to be generated during rearward travel can be made smaller than that during forward travel.

In the embodiment, the torque restriction value for rearward travel is set to be smaller than the torque restriction value for forward travel (|T(−)max|<|T(+)max|).

Figure 6:
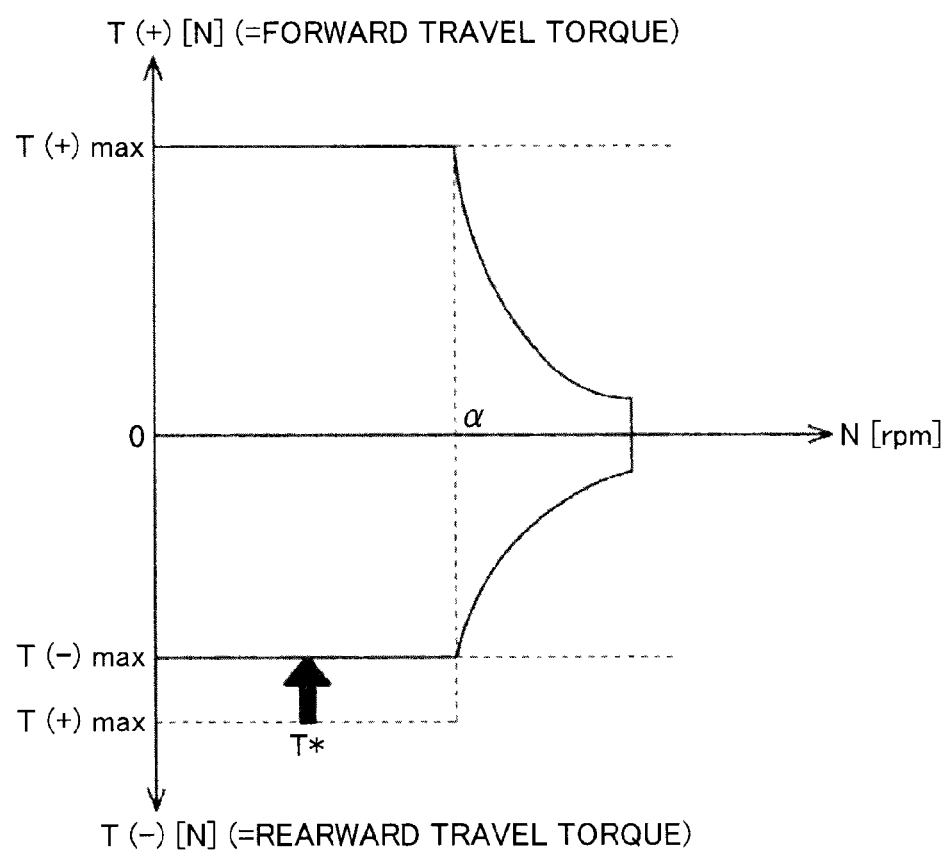
FIG. 6 illustrates torque restriction values for forward travel torque and rearward travel torque.

With reference to FIG. 6, in the case where torque to be generated during forward travel is defined as forward travel torque T(+), the forward travel torque T(+) is at T(+)max in the motor rotational speed range in which the motor rotational speed N is up to the threshold α. The forward travel torque T(+) becomes gradually smaller as the motor rotational speed N becomes more than the threshold α. The torque restriction value for the forward travel torque T(+) is T(+)max.

In the case where torque to be generated during rearward travel is defined as rearward travel torque T(−), the rearward travel torque T(−) is at T(−)max in the motor rotational speed range in which the motor rotational speed N is up to the threshold α. In the motor rotational speed range, if a value that is more than T(−)max is commanded as the torque command value T*, the value is forcibly reduced to T(−)max. The rearward travel torque T(−) becomes gradually smaller as the motor rotational speed N becomes more than the threshold α. The torque restriction value T(−)max during rearward travel is smaller than the torque restriction value T(+)max during forward travel.

The torque restriction value T(−)max during rearward travel is smaller than the torque restriction value T(+)max during forward travel. Therefore, the maximum value of torque to be generated during rearward travel is smaller than the maximum value of torque to be generated during forward travel. During rearward travel, the load applied to the bearings of the drive unit 20 is reduced compared to that during forward travel. In the embodiment, the load applied to the bearings such as the second input bearing 22b, the second intermediate bearing 24b, and the first output bearing 28a, on which a force in the axial direction acts particularly during rearward travel, is reduced. Thus, the life of the bearings of the drive unit 20, particularly the second input bearing 22b, the second intermediate bearing 24b, and the first output bearing 28a, can be extended.

(2) In the process in which the torque command value T* is computed (such as the process in step S100), a computation is performed on the basis of an identical map to achieve commonality of the computation process for both forward travel and rearward travel. The process in step S102 in which torque is reduced, particularly, is additionally executed during rearward travel. The commonality of the computation process described above can extend the life of the bearings of the drive unit 20 while reducing steps of the computation process related to drive.

(3) Restricting the maximum value of torque is effective in extending the life of the bearings constituting the drive unit 20, but may obstruct travel of the vehicle in some situations.

In the embodiment, in the case where the torque command value T* is not more than T(−)max in step S101, the drive motor 11 is controlled so as to generate torque computed in step S100 as it is. The torque command value T* is restricted only when the torque command value T* is more than T(−)max. Consequently, situations in which travel of the vehicle A may be obstructed can be reduced to a minimum.

The embodiment described above may be modified as appropriate to be implemented in the following forms.

The function of the speed reducer 12 to adjust power of the drive motor 11 may be implemented as adjustment in one step with the intermediate shaft 24 omitted, or may be implemented as adjustment in three steps with the input shaft 22, the intermediate shaft 24, and an additional second intermediate shaft.

Drive for which a large restriction value is set as the torque restriction value may be set in accordance with the front-rear weight distribution with loads loaded on the vehicle in consideration of the use status of the vehicle, e.g. the weight of the loads. Drive for which a large restriction value is set as the torque restriction value may be switched between forward travel and rearward travel in accordance with the use status of the vehicle discussed above.

The vehicle control device 30 may perform a driving process in which the shift position PS is checked and the torque command value T* is computed using dedicated maps for forward drive and rearward drive in accordance with the shift position PS.

A drive force for the front drive wheels 4 or the rear drive wheels 15 which are not directly coupled to the internal combustion engine 2 may be generated by in-wheel motors in place of the drive motor 11.

The vehicle A may be a hybrid vehicle with a different drive system, or a so-called electric vehicle. Besides, the vehicle A may be a fuel-cell vehicle that uses a fuel cell as a power source.

What is claimed is:

1. A vehicle control device comprising:
a computation unit that computes a torque command value for controlling a motor;
a storage unit that stores a map used by the computation unit for use to compute the torque command value; and
a shift position signal reception unit that receives a shift position signal that indicates whether a vehicle is traveling forward or rearward, wherein
the vehicle control device is programmed to control a drive unit that transfers rotation of the motor to drive wheels of the vehicle and that includes a speed reducer including a plurality of gears rotatably supported by bearings, wherein
the vehicle control device is programmed to calculate the torque command value for causing the motor to generate torque on the basis of the map, wherein
the vehicle control device is programmed to set a maximum value of torque that is allowed to be generated by the motor during forward travel of the vehicle so as to be different from a maximum value of torque that is allowed to be generated by the motor during rearward travel of the vehicle, wherein
the vehicle control device is programmed to set the maximum value of torque that is allowed to be generated by the motor during forward travel so as to be larger than that during rearward travel, based on a weight on a front side of the vehicle being larger than a weight on a rear side of the vehicle; and
the vehicle control device is programmed to set the maximum value of torque that is allowed to be generated by the motor during rearward travel so as to be larger than that during forward travel, based on the weight on the rear side of the vehicle being larger than the weight on the front side of the vehicle.

2. The vehicle control device according to claim 1, wherein in the case that the vehicle control device is programmed to set the maximum value of torque that is allowed to be generated by the motor during forward travel so as to be larger than that during rearward travel, the vehicle control device is programmed to restrict the torque command value during forward travel to the same value as the maximum value of torque during forward travel, and
in the case that the vehicle control device is programmed to set the maximum value of torque that is allowed to be generated by the motor during rearward travel so as to be larger than that during forward travel, the vehicle control device is programmed to restrict the torque command value during rearward travel to the same value as the maximum value of torque during rearward travel.

* * * * *